(12) United States Patent
Kazmi et al.

(10) Patent No.: US 8,730,924 B2
(45) Date of Patent: May 20, 2014

(54) METHOD AND ARRANGEMENT IN A TELECOMMUNICATION SYSTEM

(75) Inventors: Muhammad Kazmi, Bromma (SE); Robert Baldemair, Hägersten (SE); Anders Furuskär, Stockholm (SE); Klas Sjerling, Bromma (SE); Farshid Ghasemzadeh, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1416 days.

(21) Appl. No.: 12/513,282

(22) PCT Filed: Oct. 23, 2007

(86) PCT No.: PCT/SE2007/050768
§ 371 (c)(1),
(2), (4) Date: Dec. 14, 2009

(87) PCT Pub. No.: WO2008/054310
PCT Pub. Date: May 8, 2008

(65) Prior Publication Data
US 2010/0118836 A1     May 13, 2010

(30) Foreign Application Priority Data
Nov. 2, 2006 (SE) .................................. 0602345

(51) Int. Cl.
*H04J 3/00* (2006.01)
(52) U.S. Cl.
USPC .................................................. 370/336
(58) Field of Classification Search
USPC ........................................ 370/336; 455/561
See application file for complete search history.

(56) References Cited

U.S. PATENT DOCUMENTS

| 8,085,867 | B2 * | 12/2011 | Kataoka ........................ 375/295 |
| 2004/0037214 | A1 * | 2/2004 | Blasco Claret et al. ....... 370/203 |
| 2005/0085236 | A1 * | 4/2005 | Gerlach et al. ................ 455/450 |
| 2005/0152314 | A1 * | 7/2005 | Sun et al. ...................... 370/334 |

(Continued)

FOREIGN PATENT DOCUMENTS

EP      1681822 A2     7/2006

OTHER PUBLICATIONS

3rd Generation Partnership Project. 3GPP TSG-RAN WG4 (Radio) Meeting #40, R4-060853, "Reserved Sub-carriers for LTE," Tallinn, Estonia, Aug. 28-Sep. 1, 2006.

(Continued)

*Primary Examiner* — Brandon Renner
*Assistant Examiner* — Faisal Choudhury
(74) *Attorney, Agent, or Firm* — Coats & Bennett, P.L.L.C.

(57) ABSTRACT

The present invention relates to a method for sending reserved sub-carriers to a UE for the purpose of reducing peak to average power ratio (PAPR) of the transmitted signal to ensure sufficient quality of the modulated signal to achieve high data rate, including the steps of sending the information related to dynamic activation and deactivation of reserved sub-carriers on a common channel, which is readable for all UEs in idle and in connected mode; dynamically activating the transmission of the reserved sub-carriers in a cell when high modulation quality is to be maintained; dynamically deactivating the transmission of the reserved sub-carriers in a cell when high modulation quality is not required. The invention furthermore relates to a radio base station and a UE relating to said method.

18 Claims, 6 Drawing Sheets

(56) References Cited

U.S. PATENT DOCUMENTS

| | | | |
|---|---|---|---|
| 2005/0163067 A1* | 7/2005 | Okamoto et al. | 370/321 |
| 2005/0238015 A1* | 10/2005 | Jurgensen et al. | 370/389 |
| 2006/0233227 A1* | 10/2006 | Tzannes et al. | 375/219 |
| 2007/0121483 A1* | 5/2007 | Zhang et al. | 370/208 |
| 2007/0183391 A1* | 8/2007 | Akita et al. | 370/350 |
| 2007/0242598 A1* | 10/2007 | Kowalski | 370/206 |
| 2007/0297386 A1* | 12/2007 | Zhang et al. | 370/344 |
| 2009/0203405 A1* | 8/2009 | Horneman et al. | 455/562.1 |
| 2009/0220022 A1* | 9/2009 | Eberlein et al. | 375/267 |
| 2010/0177847 A1* | 7/2010 | Woodward | 375/296 |
| 2012/0076228 A1* | 3/2012 | Wu et al. | 375/267 |

OTHER PUBLICATIONS

3rd Generation Partnership Project. 3GPP TSG-RAN WG4 (Radio) Meeting #40, R4-060739, "Initial Results for BS PAPR Impact of EVM Requirements," Tallinn, Estonia, Aug. 28-Sep. 1, 2006.

3rd Generation Partnership Project. 3GPP TSG-RAN WG4 (Radio) Meeting #40, R1-062929, "Comparison of DL Papr Reduction Methods," Seoul, Korea, Oct. 1-13, 2006.

* cited by examiner

METHOD AND ARRANGEMENT IN A TELECOMMUNICATION SYSTEM

FIELD OF THE INVENTION

The present invention relates to reduction of high peak to average power ratio (PAPR) in an OFDM-based telecommunication system.

BACKGROUND

In E-UTRAN, OFDMA technology is used for downlink transmission, see 3GPP TR 25.814, "Physical Layer Aspects for Evolved UTRA". OFDM waveforms have typically high peak to average power ratio (PAPR), see 3GPP TR 25.814, "Physical Layer Aspects for Evolved UTRA" and R4-060853, Ericsson, Reserved sub-carriers for LTE. High PAPR leads to inefficient radio implementation since radio frequency (RF) components such power amplifiers have to be over dimensioned to account for peak (or maximum) transmission power levels, which occurs infrequently. Therefore, techniques are needed to reduce the high Peak to Average Power Ratio (PAPR).

In the following, various technological aspects, requirements, and limitations related to high bit rate transmission in E-UTRAN systems are described.

In E-UTRAN very high downlink data rate is envisaged. In order to achieve the high data rate, techniques such as higher order modulation and MIMO schemes will be used. High order modulation such as 64 QAM or 16 QAM used in conjunction with MIMO could provide very high data rate provided the modulation quality levels of the signal at the transmitter and at the receiver are sufficiently good. High modulation quality would imply high SINR, which is required to achieve a high data rate since it would allow higher order modulation to be used. Error vector magnitude (EVM) is one of well known and reliable performance metric to judge the modulation quality. EVM is the measure of the level of impairment of the transmitted and received signal. It is also used in UTRAN for both base station and UE transmitter modulation quality (see TS 25.104, Base Station (BS) radio transmission and reception (FDD), and TS 25.101, User equipment (UE) radio transmission and reception (FDD)). The same measure (EVM) will also be used in E-UTRAN to specify the modulation quality.

It has been shown that the downlink transmitter EVM requirement for 64 QAM in E-UTRAN is in the order of 4% in order to minimize significant throughput loss (see R4-061172, Ericsson, Reserved sub-carriers for LTE). The results on throughput loss for different EVM levels are shown in FIG. 1.

An OFDMA waveform itself has inherently high PAPR. OFDMA waveform coupled with higher order modulation to achieve high data rate also leads to even worse PAPR, i.e. very high PAPR. High PAPR is not desirable from radio implementation point of view. Therefore, techniques are used to reduce PAPR but such techniques should not degrade the EVM requirement needed for high data rate. In order to reduce the PAPR the signal is generally clipped at the transmitter. The clipping is a non linear operation; on the one hand it reduces the PAPR, but on the other hand it would also introduce additional noise, which is often referred to as clipping noise. Therefore, a technique is needed to eliminate the clipping noise or at least reduce its effect on the useful sub-carriers that carry signaling or data.

A well known technique is "Tone Reservation" or sub-carrier reservation. This scheme requires a small percentage of reserved sub-carriers (sub-carriers not carrying data) dedicated to PAPR reduction. The clipping noise is incorporated by the transmitter into the reserved sub-carriers, which are eventually discarded by the UE as explained further below. The needed percentage of reserved sub-carriers depends on various factors such as the FFT (Fast Fourier Transform) size, goal for PAPR, number of iterations for the algorithms to converge, etc, but is typically small. By introducing some reserved sub-carriers, PAPR is reduced while maintaining low EVM (high modulation quality) on the data symbol. This consequently preserves the needed SNR for higher order modulations and coding schemes to reach high peak rates.

As stated above the clipping noise from pilot or data sub-carriers are added to the reserved sub-carriers. This makes the pilot or reference symbols less noisy. The channel estimation and eventually the demodulation at the UE are done on the reference or pilot symbols. Thus another advantage of the reserved sub-carriers is that it improves the demodulation at the UE.

Considering a PAPR reduction scheme utilizing reserved sub-carriers with target PAPR of 7 dB, 16 iterations and IFFT (Inverse Fast Fourier Transform) size of 512, the percentage of the reserved sub-carriers versus data symbol EVM can be obtained from the curve in FIG. 2.

Given the proposed transmitter EVM of 4%, we would need to limit the residual EVM due to PAPR reduction to 1.5%-2% which indicates that 5% reserved sub-carriers would be sufficient.

Reserved sub-carriers imply a spectrum efficiency loss of 5% but the degradation in throughput by not having sufficient EVM requirements would be significantly higher then a 5% spectrum efficiency loss due to reserved sub-carriers (see FIG. 1).

The reserved sub-carriers are generally spread over the entire cell transmission bandwidth with a certain pattern. The pattern may depend upon the cell bandwidth size. However, for a given bandwidth and number of reserved tones the pattern is generally the same.

In E-UTRAN the broadcast channel (BCH) is transmitted in the center of cell transmission bandwidth. The bandwidth of BCH is 1.25 MHz. Furthermore, the BCH is not transmitted continuously in time. The current working assumption is that it is transmitted once or twice (one or two TTI) per 10 ms frame.

The downlink L1/L2 control information in E-UTRAN is used for resource allocation. In a cell there are more than one L1/L2 control channels. A downlink L1/L2 control channel can be sent to a single UE or to a group of UE in a cell.

As for Peak Reduction in WCDMA, the downlink waveform without peak reduction schemes has high PAPR (e.g. ~10-12 dB) in UTRA (see TS 25.141, Base Station (BS) conformance testing (FDD)). There are efficient schemes based on implementation such as clipping to reduce the PAPR without violating the modulation quality requirements (EVM and PCDE, Peak Code Domain Error) stated for both QPSK and 16 QAM modulations in TS 25.104, Base Station (BS) radio transmission and reception (FDD). Hence, in UTRA no reserved tones or symbols are used to reduce PAPR.

The concept of reserved sub-carriers to reduce PAPR is a well known concept. It should be noted that the terms tones and sub-carriers are interchangeably used in the literature but they have the same meaning. However, the general assumption is that they are always transmitted in a cell. This leads to wastage of bandwidth when reserved tones (or sub-carriers) are not needed to achieve target PARP, e.g. in low-data rate scenarios. Secondly, the pattern of the reserved sub-carriers needs to be standardized in order to ensure that UE receiver knows the occurrence and pattern of the reserved sub-carriers. This approach does not provide any flexibility to the network since the same pattern is to be used. The pattern is generally characterized by the positions or frequency of occurrence of sub-carriers within the cell transmission bandwidth in the frequency domain.

SUMMARY

One key aspect of the previously described techniques is that reserved sub-carriers may not be needed all the time. In a cell when high order modulation and coding is used, tight EVM requirements are to be maintained. This means reserved sub-carriers need to be transmitted to ensure low PAPR at least when higher order modulation is used. On the other hand transmitting reserved sub-carriers when high EVM is acceptable would lead to wastage of cell bandwidth resources.

Whether to use higher order modulation depends upon the downlink quality feedback from the UE and the amount of traffic in the buffer. Hence, in principle the reserved sub-carriers may be needed on one TTI, whereas they may not be needed in another TTI. This means that during the TTI in which reserved sub-carriers are not needed, the bandwidth that constitutes the reserved sub-carriers can be utilized for data transmission. The overheads of reserved sub-carriers depend upon a particular pattern, which in turns varies from one implementation to another. Generally, it amount to about 5% to 10% of the cell transmission bandwidth.

It is therefore an object of the present invention to provide a method where the bandwidth is used more efficiency than it is with previously known techniques. This is achieved by the method according to the invention. More specifically, the invention relates to a method in a radio base station in a cellular radio communication network for sending reserved sub-carriers for the purpose of reducing peak to average power ratio (PAPR) of the transmitted signal to ensure sufficient quality of the modulated signal to achieve high data rate, including the steps of sending the information related to dynamic activation and deactivation of reserved sub-carriers on a common channel, which is readable for all UEs in idle and in connected mode;

dynamically activating the transmission of the reserved sub-carriers in a cell when high modulation quality is to be maintained;

dynamically deactivating the transmission of the reserved sub-carriers in a cell when high modulation quality is not required.

Hereby, efficient use of cell transmission bandwidth is achieved since reserved sub-carriers pattern is transmitted only when high modulation quality is desired.

The reserved sub-carriers are dynamically enabled and disabled in a cell as fast as every TTI. The pattern of the reserved sub-carriers is indicated to the UEs in the system information (BCCH). The activation and deactivation of the reserved sub-carriers is indicated to all the UEs by sending a short command on physical layer (L1/L2) control channel.

Furthermore, the invention implies fast enabling and disabling of reserved sub-carriers on a TTI level. This can allow a network to take full advantage of fast channel variation (e.g. use higher order modulation and have low PAPR).

The invention also relates to a radio base station capable of sending reserved sub-carriers for the purpose of reducing peak to average power ratio (PAPR) of the transmitted signal to ensure sufficient quality of the modulated signal to achieve a high data rate. The radio base station comprises a unit adapted for signaling activation/deactivation of reserved sub-carriers on a common channel, which is readable for all UEs in idle and in connected mode; and a unit adapted for dynamic activation/de-activation of transmission of reserved sub-carriers dependent on if high modulation quality is to be maintained or not.

The invention furthermore relates to a method in a user equipment for using reserved sub-carriers to improve the modulation quality of the received signal in idle and in connected mode. The method includes the steps of acquiring a first set of information, comprising information on the reserved sub-carriers patterns used in a cell, acquiring a second set of information, indicating whether one or more reserved sub-carrier pattern is activated or not in a particular TTI;

interpreting the first and second set of information to make efficient use of the cell transmission bandwidth.

According to a specific embodiment of the invention, the user equipment acquires the first information by reading the system information sent on a common channel, e.g. the BCH. Alternatively the UE may acquire said information from the standard, i.e. by standardization.

The invention further relates to a user equipment comprising means for performing the method described in the foregoing.

One aspect of the invention implies simplified signaling which does not require a UE in the connected mode to read the BCH. The UE can be informed by a short command via a downlink L1/L2 control channel in which TTI the reserved sub-carriers are enabled or disabled.

BRIEF DESCRIPTION OF THE DRAWINGS

The foregoing and other objects, features and advantages of the invention will be apparent from the following detailed description of preferred embodiments as illustrated in the drawings.

DETAILED DESCRIPTION

Figure 1:
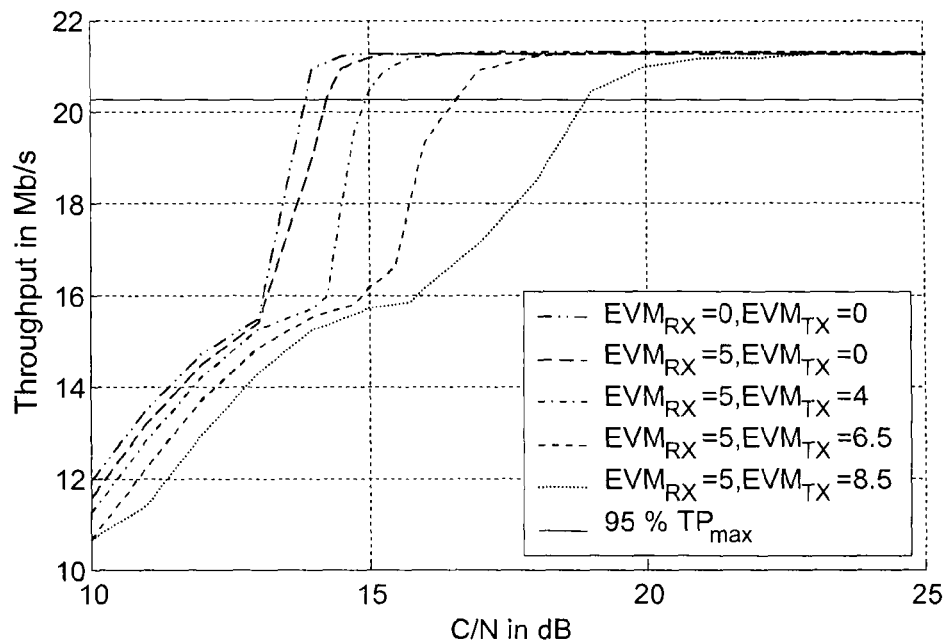
FIG. 1 illustrates the throughput versus RX and TX impairment for AWGN.
Figure 2:
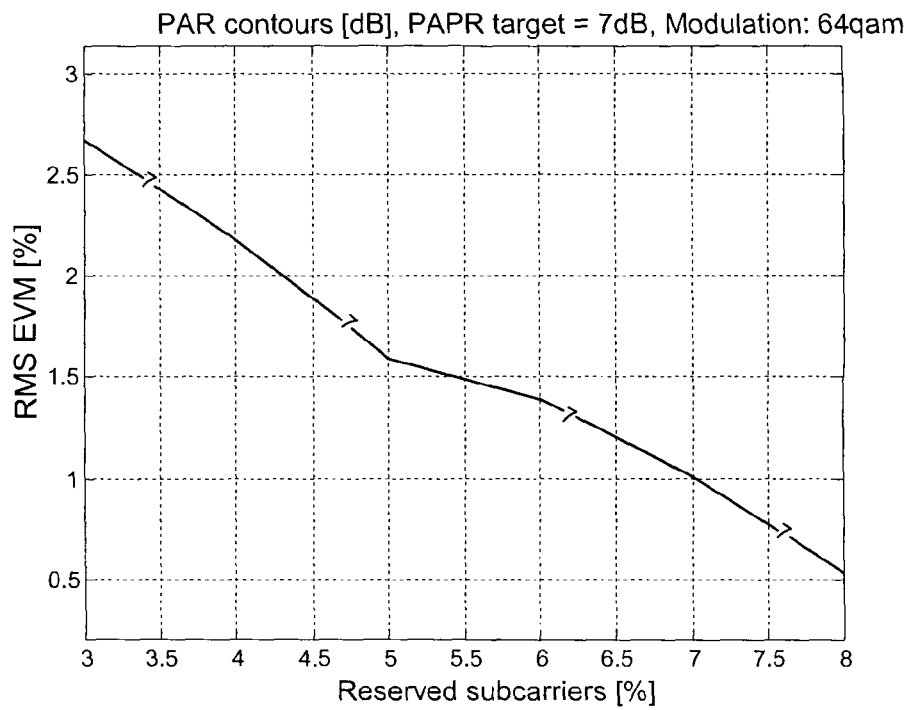
FIG. 2 illustrates the percentage of reserved sub-carriers versus residual EVM for PAPR target of 7 dB.
Figure 3:
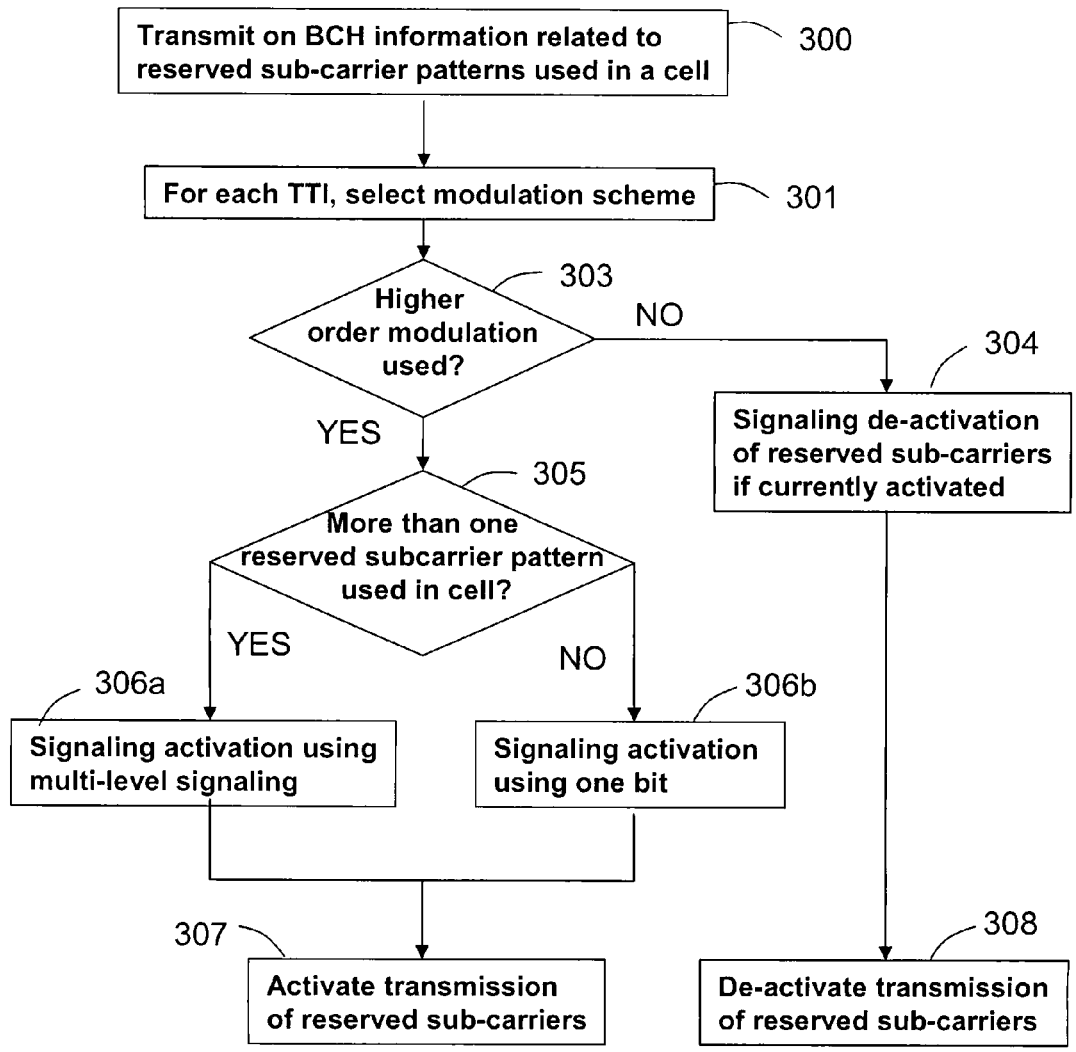
FIG. 3 is a flow chart illustrating schematically one embodiment of the method according to the invention performed by the base station.

In the following, the dynamic activation of reserved sub-carriers according to the invention will be described. One embodiment of the invention is illustrated in FIG. 3 with a flow chart showing the method performed by the base station. According to step 300, the base station broadcasts on the BCH information that relates to the one or more reserved sub-carrier patterns that is used in the cell. The UE needs to know the pattern of reserved sub-carriers in advance in order to be able to demodulate the downlink channel. One alternative possibility would be to standardize the pattern, but since this is not a very flexible approach, it is preferable to send the pattern on the BCH as suggested in step 300. The UE in idle mode reads the BCH channel at least after the cell reselection. Hence, after cell reselection the UE will acquire the information related to the reserved sub-carrier patterns used in a cell including all possible patterns of the reserved sub-carriers to be used. Generally only one reserved sub-carrier pattern is to be used in a cell. However, it may vary from one cell to another depending upon the cell bandwidth used.

When the information related to the reserved sub-carrier patterns is broadcasted on the BCH, no reserved sub-carriers are to be used on the BCH channel, since new users entering the cell must be able to read the system information on the BCH without having said information related to the reserved sub-carrier patterns. According to the embodiment presented in FIG. 3, reserved sub-carriers are activated in each TTI where higher order modulation is used, and is transmitted in the entire bandwidth except in the portion of the bandwidth carrying BCH channel. In the alternative embodiment presented in FIG. 4, the reserved sub-carriers are not sent in a TTI that contains BCH. These two alternative embodiments may also be applied to other common channels, e.g. the synchronization channel (SCH).

Still referring to FIG. 3, in step 301, modulation and coding scheme for the different UEs is selected on a TTI level, meaning that the modulation may be changed for each TTI if necessary. The network selects certain modulation and coding scheme (MCS) to schedule the user in the downlink. The MCS selection depends upon the UE reported downlink channel quality indicator (CQI) and the amount of traffic in the buffer. In case higher order modulation such as 64 QAM is to be used on most resource blocks, the network needs to send the reserved sub-carriers in the entire bandwidth according to the given pattern, except for certain channels such as BCH and SCH as described in the foregoing. Thus, if higher order modulation is used in the current TTI, the base station will signal activation, or enabling, of the reserved sub-carriers in said TTI (see steps 306a and 306b). This is because the UE receiver needs to know which sub-carriers that contain the data and which sub-carriers that are used to reduce the PAPR. Said signaling may be directed to individual UEs as well as to a group of several UEs for which higher order modulation is applied. Hence, the reported CQI and traffic in the buffer can be used to dynamically enable or disable the transmission of reserved sub-carriers. Since scheduling is done every TTI, the decision whether to use reserved sub-carriers or not should be taken every TTI.

In most cases there is only one reserved sub-carrier pattern that is used in the cell. In such cases, only one bit of information is needed to indicate whether, in the current TTI, the reserved sub-carriers are used or not (see step 306b). The same is true for deactivation of reserved sub-carriers according to step 304 (i.e. only one bit information is required). However, in case more than one reserved sub-carrier pattern is used in one cell, then multi-level signaling (more than one bit) is used to indicate which pattern is activated in the current TTI (see step 306a). Such information (one or more bits) can be sent on downlink L1/L2 control channel. The downlink L1/L2 control is a generic term used to indicate that it contains both layer 1 (physical layer) and layer 2 (MAC layer) related information. It is the same as a shared control channel, which means it is sent to one or more UEs for resource allocation. Resource allocation is characterized by both layer 1 and layer 2 (MAC layer) related information. Generally the downlink L1/L2 control channel contains the identifier of the UEs, which are served (receive data) in the downlink and the corresponding allocated resources (e.g. resource blocks, modulation and coding etc) for data transmission. In a cell there may be more than one downlink L1/L2 control channels. The actual number depends upon the cell transmission bandwidths.

Every DRX cycle the UE in idle mode will read downlink L1/L2 control channel, where paging indication is mapped. Hence, by reading L1/L2 control channel the UE will be made aware whether the reserved sub-carriers are used on paging channel or not. Similarly, in a connected mode, the UE will also read downlink L1/L2 control channel or part of it (in 3GPP currently called category 0 information) to know whether reserved sub-carriers are used in the current TTI or not. The enabling of the reserved sub-carriers (see step 307) will take place earliest in the next TTI. The activation delay (i.e. the time or number of TTIs that will elapse between the activation signaling (Step 306a-b) and the actual enabling of the reserved carriers (step 307)), may be included in the information that is broadcast to all the users in the cell. Said information may also include the duration of the activation of the reserved sub-carriers, i.e. if the activation will last for 1 to N TTI: s or until a deactivation signaling is received from the base station. The same is true for the signaling of de-activation of reserved sub-carriers according to step 304 and the actual de-activation of the transmission of sub-carriers according to step 308.

Figure 4:
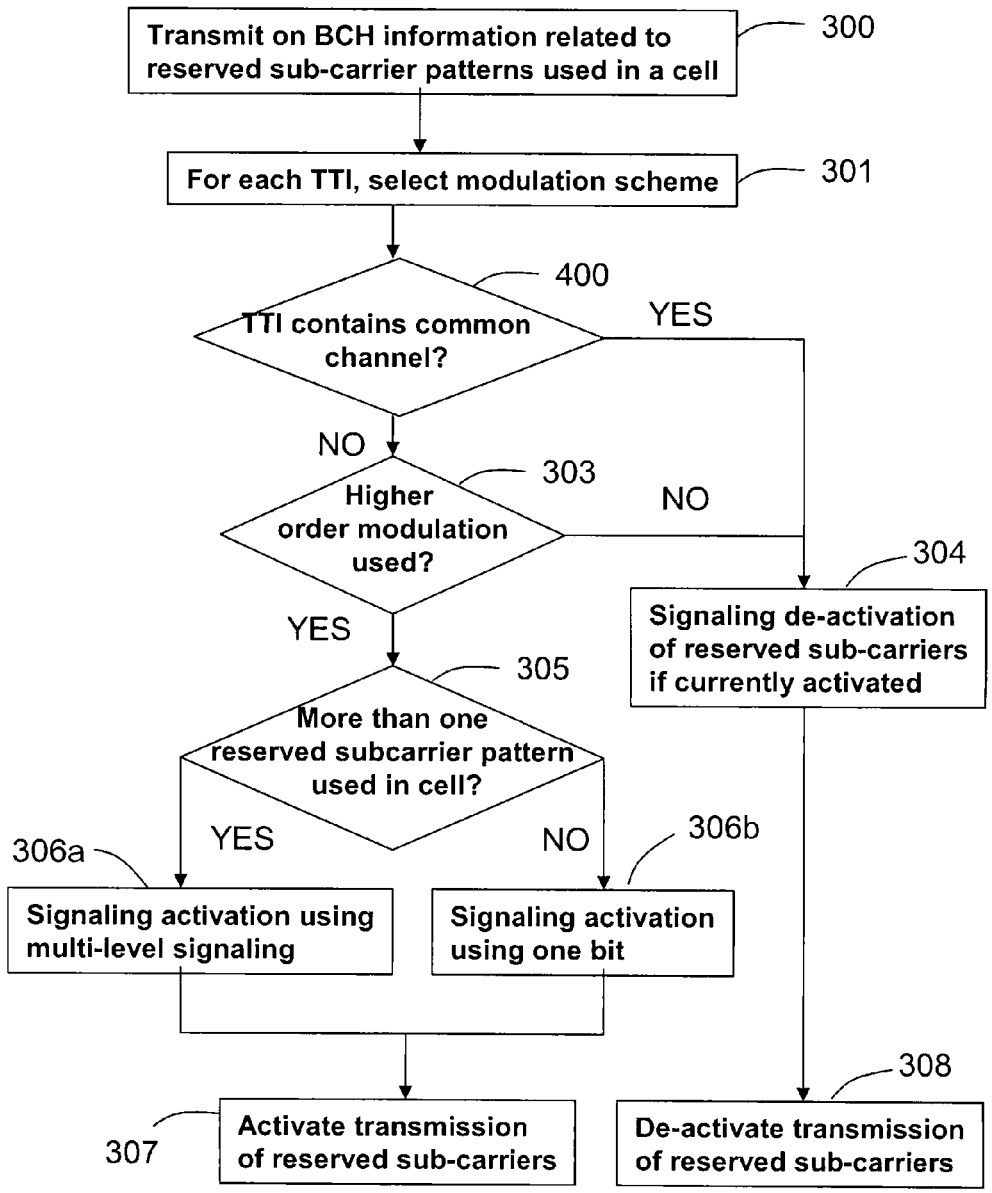
FIG. 4 is a flow chart illustrating schematically an alternative embodiment of the method according to the invention performed by the base station.

FIG. 4 shows a flow chart illustrating an alternative embodiment of the method performed by the base station. In this figure, the steps that are identical to the steps of FIG. 3 are given the same reference numbers as in FIG. 3. According to this embodiment, reserved sub-carriers are activated in TTIs where higher order modulation is used but there is no common channel such as BCH and/or SCH in the same TTI. Thus, the reserved sub-carriers are never sent in the TTIs that contain common channels such as BCH and SCH. This is illustrated in step 400, showing that if the current TTI contains a common channel such as the BCH or SCH, then the base station signals de-activation of the reserved sub-carriers if they are currently activated according to step 304. The reason for this is as previously described that new users entering the cell must be able to read the system information on the BCH without having said information related to the reserved sub-carrier patterns.

Figure 5:
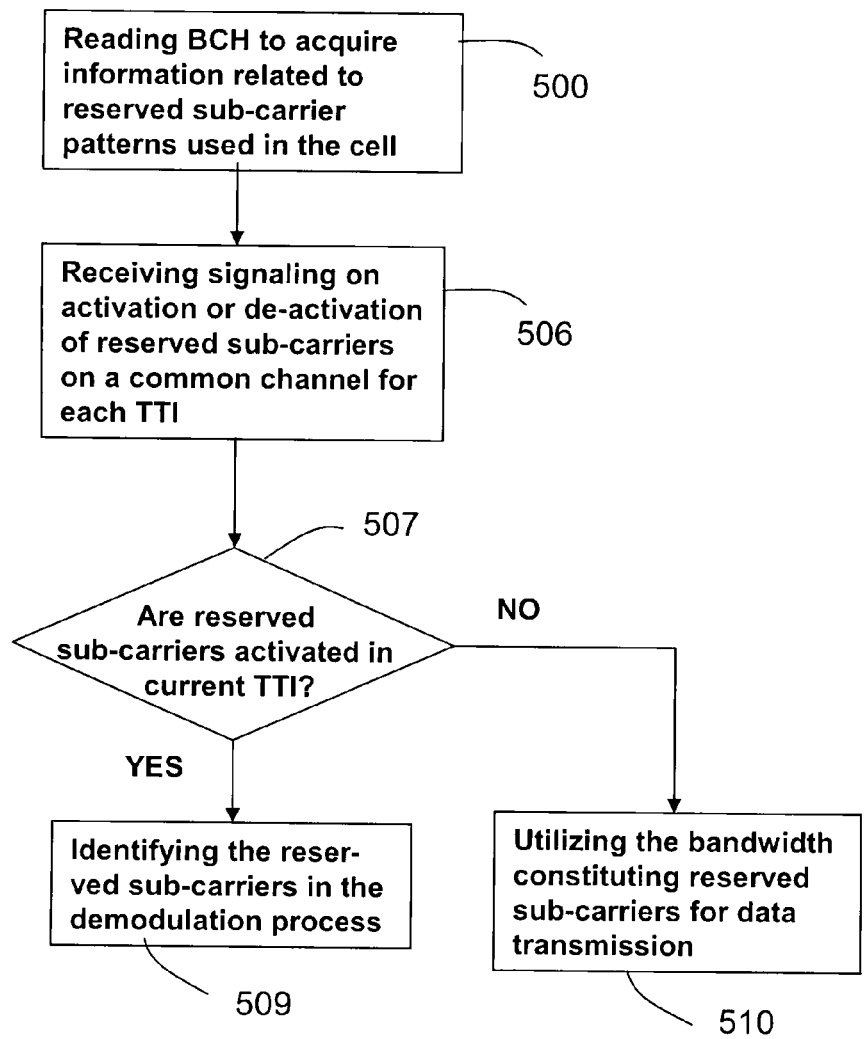
FIG. 5 is a flow chart illustrating schematically the method according to the invention performed by the UE.

FIG. 5 illustrates the method according to the invention performed by the UE. In step 500, the UE reads the BCH to acquire information related to reserved sub-carrier patterns used in the cell. This information may also include the activation delay and the duration of the activation as previously described. In step 506, the UE receives signaling from the base station on activation, when the reserved sub-carriers are required due to higher order modulation, and when activated, as to which pattern is activated, or deactivation if the reserved sub-carriers are currently activated but not required in the current TTI (see step 507). If said signaling results in the enabling of the reserved sub-carriers, the UE will identify said reserved sub-carriers and ignore them in the demodulation process (see step 509). On the other hand, if the signaling results in that no reserved sub-carriers will be enabled, the UE will utilize the bandwidth constituting reserved sub-carriers for data transmission (see step 510).

Figure 6:
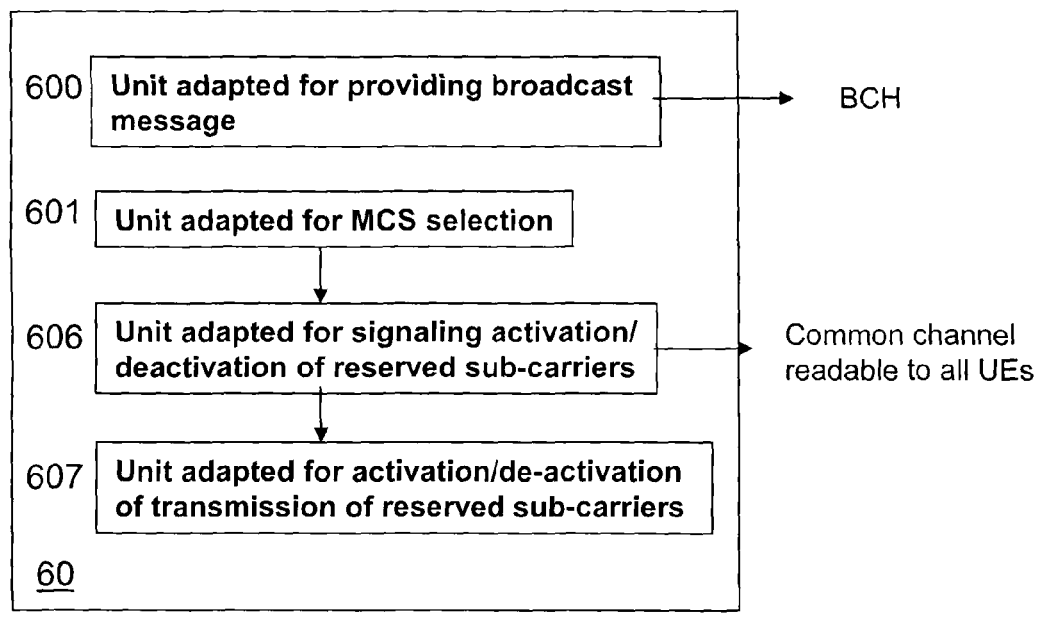
FIG. 6 is a schematic illustration of a base station according to the invention.

FIG. 6 illustrates schematically a radio base station 60 according to one embodiment of the invention. The base station obviously comprises necessary functionalities of prior art that for the sake of clarity is not shown in this figure. The base station comprises a unit for transmitting system information 600. According to a specific embodiment, said system information comprises information that depicts the reserved sub-carriers used in a cell. Said information may also include information on the activation delay, i.e. the time or number of TTIs that will elapse between the activation signaling and the actual enabling of the reserved carriers and the duration of the activation of the reserved sub-carriers, i.e. if the activation will last for 1 to N TTIs or until a deactivation signaling is received from the base station. The base station furthermore includes a unit that performs MCS (Modulation and Coding Scheme) selection, based on e.g. downlink channel quality and the amount of traffic in the buffer. Dependent on the modulation level selected, unit 606 is adapted to signal activation or deactivation of the reserved sub-carriers to the UEs that resides in the cell. The base station furthermore comprises a unit 607 that, as soon as possible after signaling of activation/de-activation (or in accordance with a specified delay), performs the actual activation or deactivation of transmission of the reserved sub-carriers. The activation of the reserved sub-carriers can take place earliest in the next TTI.

Figure 7:
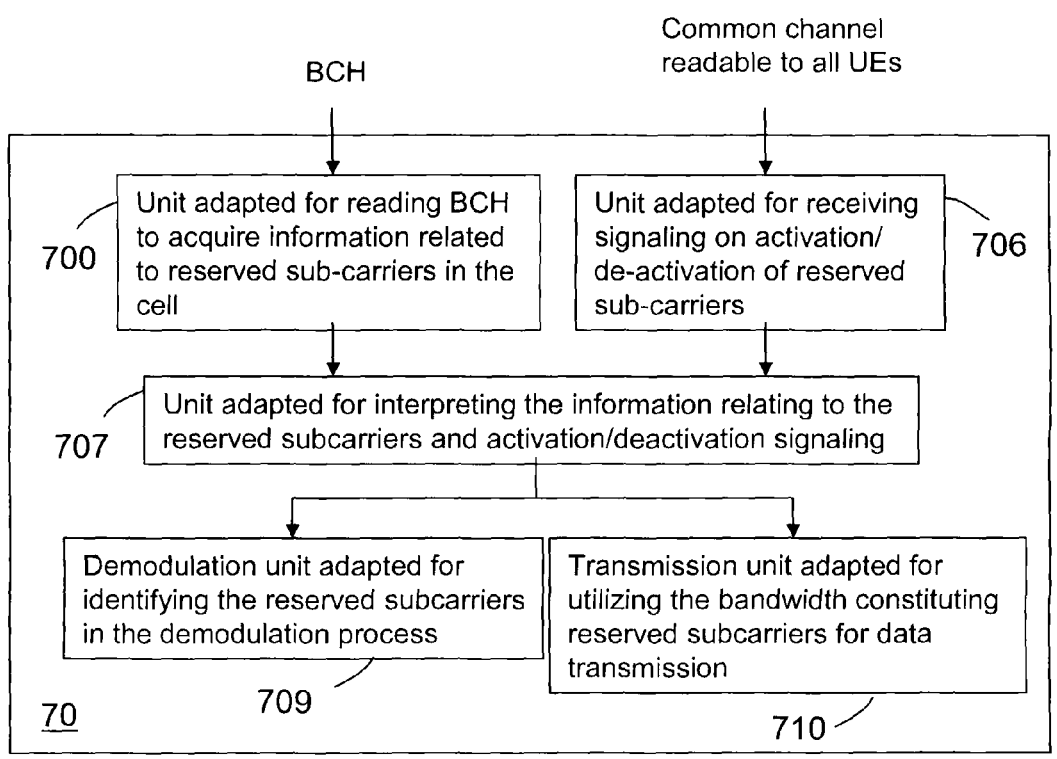
FIG. 7 is a schematic illustration of a user equipment according to the invention.

FIG. 7 illustrates schematically a user equipment, UE, 70 according to one embodiment of the invention. As for the base station, UE comprises necessary functionalities of prior art that for the sake of clarity is not shown in this figure. The UE 70 comprises a unit 700 adapted for reading the broadcast channel BCH to acquire information related to the reserved sub-carriers in the cell. Alternatively, this information may be set in the standard, and the UE would then not be required to read the BCH to acquire said information.

The UE 70 furthermore comprises a unit 706 for receiving signaling from the base station on a common channel that is readable to all UEs, to acquire information on activation or de-activation of the reserved sub-carriers. A unit 707 then interprets the acquired first and second set of information in order to determine to either utilize the reserved sub-carriers in the demodulation process carried out by a demodulation unit 709 in case the reserved sub-carriers will be activated in the next TTI, or to utilize the bandwidth constituting the reserved sub-carriers for data transmission carried out by a transmission unit 710 in case the reserved sub-carriers will not be available.

The dynamic method to activate and deactivate the reserved sub-carriers is governed by two stages of signaling information as described below:

The invention should not be limited to the example described in the foregoing, but is intended to cover various modifications within the scope of the appended claims.

The invention claimed is:

1. A method, performed in a radio base station operating in a cellular radio communication network, for sending reserved sub-carriers to reduce a peak to average power ratio (PAPR) of a transmitted signal to ensure a sufficient quality of a modulated signal to achieve a high data rate, the method comprising the steps of:
   selecting a modulation scheme for a Transmission Time Interval (TTI) level;
   sending information associated with the dynamic activation and de-activation of one or more reserved sub-carriers on a common channel, wherein the common channel is readable by user equipment (UEs) operating in one of an idle and a connected mode;
   dynamically activating transmission of the reserved sub-carriers in a cell when high modulation quality is to be maintained in a particular TTI;
   dynamically de-activating transmission of the reserved sub-carriers in a cell when high modulation quality is not required in a particular TTI, such that a bandwidth comprising the reserved sub-carriers can be used to transmit data when the reserved sub-carriers are not needed;
   wherein sending information associated with the dynamic activation and de-activation of one or more reserved sub-carriers comprises
   sending a first set of information comprising one or more patterns of the reserved sub-carriers to be used in a cell wherein system information is broadcast on a Broadcast Channel (BCH); and
   sending a second set of information to user equipment using a downlink shared control channel that carries at least one of physical layer signaling information and Media Access Control (MAC) layer signaling information, the second set of information indicating to the UE whether, in a current TTI, a particular reserved sub-carrier pattern is activated or not activated.

2. The method of claim 1 wherein the modulation scheme is selected based on downlink channel quality and an amount of traffic in a buffer.

3. The method of claim 1 wherein, in a TTI having a common channel, the reserved sub-carriers are transmitted in a portion of the cell bandwidth that does not include the common channel.

4. The method of claim 1 wherein the reserved sub-carriers are transmitted in the entire bandwidth during a TTI that does not contain a common channel.

5. The method of claim 1 wherein the common channel is a Broadcast Channel (BCH).

6. The method of claim 1 wherein the common channel is a Synchronization Channel (SCH).

7. The method of claim 1 wherein one bit of signaling is used to indicate whether the reserved sub-carrier pattern is activated or not activated in the current TTI.

8. The method of claim 1 wherein multi-level signaling is used to indicate which reserved sub-carrier pattern is activated or not activated in the current TTI.

9. The method of claim 1 wherein the first set of information includes an activation delay to be applied by the UEs, the activation delay defining one of a time or a number of TTIs between the activation/de-activation signaling, and when the one or more reserved sub-carriers are actually enabled/disabled.

10. The method of claim 1 wherein said first set of information includes a duration period of the activation of the reserved sub-carriers.

11. A radio base station configured to send reserved sub-carriers to reduce peak to average power ratio (PAPR) of a transmitted signal to ensure sufficient quality of a modulated signal to achieve a high data rate, the base station comprising
   a modulation selection unit configured to select a modulation scheme on a Transmission Time Interval (TTI) level;
   a signaling unit configured to signal the activation or de-activation of one or more reserved sub-carriers over a common channel that is accessible to UEs operating in one of an idle and a connected mode, wherein to signal the activation or de-activation of one or more reserved sub-carriers over a common channel, the signaling unit is configured to:
   send a first set of information comprising one or more patterns of the reserved sub-carriers to be used in a cell wherein system information is broadcast on a Broadcast Channel (BCH); and
   send a second set of information to a UE using a downlink shared control channel that carries at least one of physical layer signaling information and Media Access Control (MAC) layer signaling information, the second set of information indicating to the UE whether, in a current TTI, a particular reserved sub-carrier pattern is activated or not activated; and an activation unit configured to dynamically activate and de-activate the transmission of the one or more reserved sub-carriers depending on whether a high modulation quality is to be maintained in a given TTI such that a bandwidth comprising the one or more reserved sub-carriers can be used to transmit data when the one or more reserved sub-carriers are not needed.

12. A method performed by a user equipment (UE) for using reserved sub-carriers to improve a quality of a received signal when operating in one of an idle mode and a connected mode, the method comprising:

acquiring a first set of information comprising one or more patterns of the reserved sub-carriers to be used in a cell wherein system information is broadcast on a Broadcast Channel (BCH);

acquiring a second set of information using a downlink shared control channel that carries at least one of physical layer signaling information and Media Access Control (MAC) layer signaling information, the second set of information indicating whether, in a current Transmission Time Interval (TTI), a given reserved sub-carrier pattern is activated or not activated, and wherein activation of the given reserved sub-carrier pattern depends on a modulation scheme to be used in the TTI;

interpreting the second set information to determine an efficient use of the cell transmission bandwidth; and utilizing bandwidth comprising one or more reserved sub-carriers to transmit data when the one or more reserved sub-carriers are not activated in a current TTI.

13. The method of claim 12 wherein the UE acquires the first information by reading system information broadcast on a common channel.

14. The method of claim 13 wherein the UE operating in idle mode acquires the first information after performing a cell reselection procedure.

15. The method of claim 14 wherein the UE operating in idle mode acquires the second information at least once per Discontinuous Reception (DRX) cycle.

16. The method of claim 13 wherein the UE operating in connected mode acquires the second information every TTI.

17. The method of claim 12 further comprising the UE identifying the one or more reserved sub-carriers if they are activated, and ignoring the one or more reserved sub-carriers during demodulation.

18. A user equipment capable of using reserved sub-carriers to improve the modulation quality of a received signal in idle and in connected mode, comprising an information acquisition unit configured to acquire a first set of information comprising one or more patterns of the reserved sub-carriers to be used in a cell wherein system information is broadcast on a Broadcast Channel (BCH);

a receiving unit configured to receive signaling using a downlink shared control channel that carries at least one of physical layer signaling information and Media Access Control (MAC) layer signaling information, the signaling indicating whether, in a current Transmission Time Interval (TTI), a given reserved sub-carrier pattern is activated or not activated, and wherein the activation of the given reserved sub-carrier depends on a modulation to be used in the given TTI;

an interpreting unit configured to interpret the information regarding the reserved sub-carrier patterns, and the activation/deactivation signaling; and a transmission unit configured to utilize bandwidth comprising one or more reserved sub-carriers for data transmission when the one or more reserved sub-carriers are not activated in a current TTI.

* * * * *